(12) United States Patent
Yajima et al.

(10) Patent No.: US 11,972,916 B2
(45) Date of Patent: Apr. 30, 2024

(54) FALL DETECTION SENSOR

(71) Applicant: NIPPON ALEPH CO., LTD., Tokyo (JP)

(72) Inventors: Koichi Yajima, Tokyo (JP); Eiichi Kosuge, Tokyo (JP); Masaya Hagiyama, Tokyo (JP)

(73) Assignee: Nippon Aleph Co., Ltd., Tokyo (JP)

( * ) Notice: Subject to any disclaimer, the term of this patent is extended or adjusted under 35 U.S.C. 154(b) by 311 days.

(21) Appl. No.: 17/630,377

(22) PCT Filed: Jul. 17, 2020

(86) PCT No.: PCT/JP2020/027924
§ 371 (c)(1),
(2) Date: Jan. 26, 2022

(87) PCT Pub. No.: WO2021/020184
PCT Pub. Date: Feb. 4, 2021

(65) Prior Publication Data
US 2022/0285113 A1 Sep. 8, 2022

(30) Foreign Application Priority Data

Jul. 27, 2019 (JP) .................................. 2019-138402

(51) Int. Cl.
*H01H 36/00* (2006.01)
*G01C 9/06* (2006.01)
*H01H 35/02* (2006.01)

(52) U.S. Cl.
CPC .......... *H01H 36/0013* (2013.01); *G01C 9/06* (2013.01); *H01H 35/02* (2013.01); *G01C 2009/064* (2013.01)

(58) Field of Classification Search
CPC . G01C 2009/064; G01C 9/06; G01P 15/0891; G01P 15/135; H01H 35/02; H01H 35/022; H01H 35/025; H01H 36/0013
See application file for complete search history.

(56) References Cited

U.S. PATENT DOCUMENTS 5,373,125 A * 12/1994 Ford .................. H03K 17/9517
335/205
6,301,795 B1 * 10/2001 Kang ...................... G01C 9/06
33/366.11

(Continued)

FOREIGN PATENT DOCUMENTS

| JP | S54132783 A | 10/1979 |
| JP | S6370017 U | 5/1988 |

(Continued)

OTHER PUBLICATIONS

International Search Report for PCT/JP2020/027924 dated Oct. 20, 2020.

(Continued)

*Primary Examiner* — Vinh P Nguyen
(74) *Attorney, Agent, or Firm* — Millen, White, Zelano & Branigan P.C.; William F. Nixon (57) ABSTRACT

A compact fall detection sensor includes a case. A magnet is housed in the case. A reed switch with a pair of reeds are integrally positioned around the central axis of the case at the bottom of the case. In an upright state, the magnet is gravitationally positioned in the longitudinal direction of the reed switch around the central axis of the curved surface of the case, each magnetic pole magnetizing the corresponding reed of the reed switch, allowing one of the reeds to be magnetized to N pole and the other reed to S pole to turn on the switch. When inclined from the upright state, the magnet slides along the curved surface of the case and deviates from (Continued)

the central axis, to position only one of the magnetic poles of the magnet around the central axis to turn off the reed switch.

5 Claims, 8 Drawing Sheets

(56) References Cited

U.S. PATENT DOCUMENTS

| | | | |
|---|---|---|---|
| 7,555,841 B2* | 7/2009 | Steinich | G01C 9/12 |
| | | | 33/398 |
| 10,317,208 B2* | 6/2019 | Schafer | G01C 9/06 |

FOREIGN PATENT DOCUMENTS

| | | |
|---|---|---|
| JP | H01170808 A | 7/1989 |
| JP | H0763556 A | 3/1995 |

OTHER PUBLICATIONS

English Abstract of JPH01170808, Publication Date: Jul. 5, 1989.
English Abstract of JPH0763556, Publication Date: Mar. 10, 1995.

* cited by examiner

| | Angle with respect to the reed switch | Inclination angle | Side face | Top face |
|---|---|---|---|---|
| (I) | 0 | 0 | | |
| (II) | 45 | 10 | | |
| (III) | 45 | 20 | | |
| (IV) | 45 | 30 | | |

FIG. 5

| | Angle with respect to the reed switch | Inclination angle | Side face | Top face |
|---|---|---|---|---|
| (I) | 0 | 0 | | |
| (II) | 0 | 30 | | |
| (III) | 45 | 30 | | |
| (IV) | 90 | 30 | | |

FIG. 8

FALL DETECTION SENSOR

TECHNICAL FIELD

The present invention relates to a fall detection sensor for detecting fall of various appliances, such as fan heaters and electric hot-water pots, and two-wheeled motor vehicles.

BACKGROUND ART

A fall detection sensor is generally used to detect fall during use of various appliances, such as fan heaters and electric hot-water pots, and two-wheeled motor vehicles. Two-wheeled motor vehicles are equipped with the fall detection sensor to prevent leakage of gasoline in case of a fall. As such fall detection sensors, several simple-structured sensors that use a reed switch, which does not require power feeding, are well known.

For example, Patent Literature 1 discloses an inclination sensor where a permanent magnet and a magnetic fluid are housed in a hollow non-magnetic case that has a slanted surface on the bottom face, and a magnetic induction element (reed switch) sensitive to the magnetism of the permanent magnet is mounted on the lower side of the bottom face. With this inclination sensor, when an object whose inclination is to be detected is in an upright state, one of the reeds of the reed switch is magnetized by the permanent magnet positioned at the center of the bottom face of the case, closing the contact of the reed switch.

If the object inclines from the upright state, since the permanent magnet deviates from the center position on the bottom face of the case, neither one of the reeds is magnetized, and the contact of the reed switch is opened. In other words, the contact of the reed switch changes from closed state to opened state, indicating that the object has inclined. Such a switch is called a normally closed contact or b-contact.

Meanwhile, in the case where an auxiliary magnet is placed below the reed switch, if the object is in the upright state, both reeds of the reed switch are magnetized to become the same pole respectively by the permanent magnet and the auxiliary magnet. Repulsive force is thus generated between both reeds, maintaining the off state of the contact of the reed switch. In this case, if the object inclines, allowing the permanent magnet to deviate from the center on the bottom face of the case, the auxiliary magnet only magnetizes one of the reeds of the reed switch, thus closing the contact of the reed switch. Such a switch is called a normally open contact or a-contact.

Figure 7:
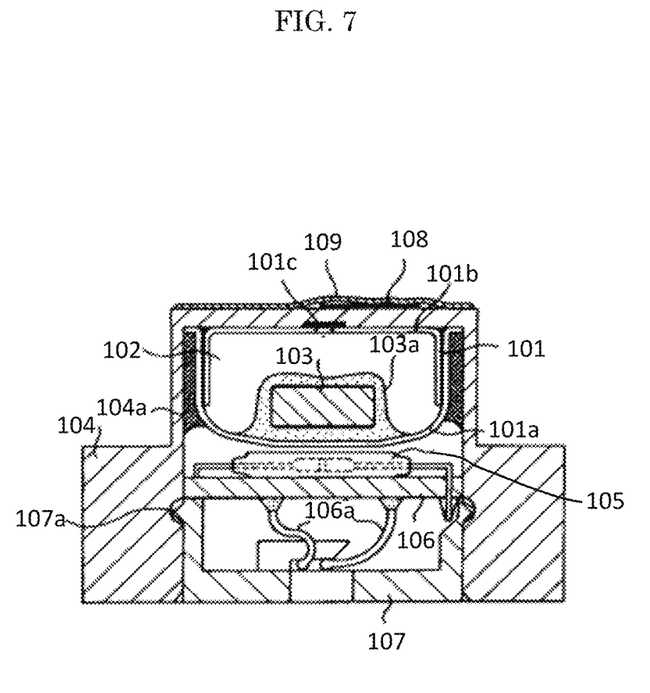
FIG. 7 is a schematic cross-sectional view showing a typical configuration of a conventional fall detection sensor.

Patent Literature 2 discloses an inclination sensor that uses a reed switch. This inclination sensor is structured as shown in FIG. 7. The case 101 made of aluminum, which is non-magnetic, has a tightly closed hollow portion 102, with a cup-shaped case 101a and a lid 101b attached to each other with an adhesive agent at overlapped part. The hollow portion 102 houses a roughly disk-shaped permanent magnet 103 whose surface is covered with a magnetic fluid 103a. At the upper part of a base 104 made of a plastic molding, the case 101 is inserted and fastened with a resin 104a. A reed switch 105 as a magnetic induction element is placed on a printed circuit board 106, its reed terminals are soldered, and lead wires 106a are drawn out of the printed circuit board 106. A back cover 107 is fastened by engaging nails 107a that protrude from the opposing sides of the back cover 107 with the recessed portion formed inside the base 104. An amorphous magnetic piece 108 attached at the top portion of the base 104 adjusts the response angle of the inclination sensor based on its adhesion position.

According to such an inclination sensor, in the horizontal state (upright state), since the two reeds that constitute the reed switch 105 are magnetized to the same pole by the magnetic force of the permanent magnet 103, they react each other, thus maintaining the off state. With inclination, the permanent magnet 103 moves in the inclination direction within the hollow portion 102 of the non-magnetic case 101, causing one of the reeds of the reed switch 105 to change to the opposite pole. The two reeds are thus made to attach to each other, and the switch is turned on. In this case, the magnetic force of the permanent magnet 103 acts on the reed switch regardless of whether it is in off or on state. In other words, the reed switch 105 is always affected by the magnetic force of the permanent magnet regardless of whether it is in on or off state.

CITATION LIST

Patent Literature

Patent Literature 1: JP 1988-70017 U
Patent Literature 2: JP 1-170808 A

SUMMARY OF INVENTION

Problem to be Solved by the Invention

Sine the reed switch of the inclination sensor according to Patent Literature 1 is arranged vertically in the upright state, the size of the inclination sensor necessarily comes large in the vertical direction. Also, one of the reeds of the reed switch is magnetized in a state where the permanent magnet is placed at the center of the bottom face, turning on the contact of the reed switch. When the permanent magnet gets away with inclination, the permanent magnet loses its magnetic effect, turning off the contact of the reed switch. Specifically, the other reed is not magnetized by the permanent magnet in the on state, which presents the possibility that the on state is not maintained stably. Also, since the off state is caused by the loss of magnetism of the reeds, the on or off state may not be maintained due to external effect such as magnetic field and vibration. Furthermore, in the case where the auxiliary magnet is equipped, both reeds are magnetized to the same pole, repelling each other, and maintaining the off state stably. However, since one of the reeds only is subject to the magnetic effect, causing the on state to occur, the on state might not be maintained due to the external effect such as magnetic field and vibration.

With the inclination sensor in Patent Literature 2, since the reed switch 105 is placed on the printed circuit board 106 horizontally in the upright state, the whole inclination sensor can be structured compact in the vertical direction. In addition, since each reed of the reed switch is subject to the magnetic effect of the magnetic force of the permanent magnet 103 both in the on and off states, the on and off states can be maintained stably.

Figure 8:
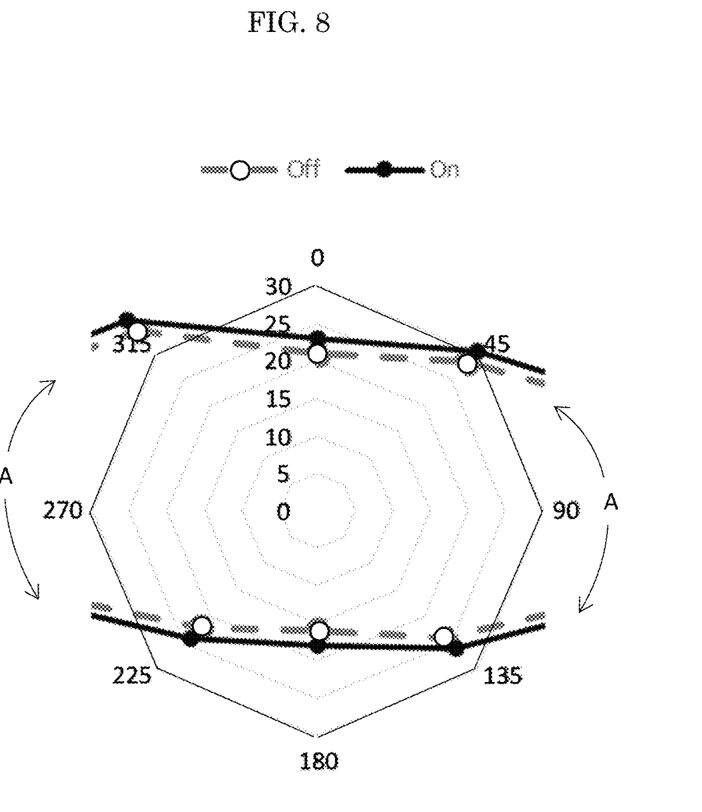
FIG. 8 is a chart showing the on and off angles of the fall detection sensor in FIG. 7 in various inclination directions.

However, the inventor et. al of the present invention fabricated an inclination sensor according to the prior art, measured the on and off angles of the reed switch 105 in various inclination directions, and obtained the measurement results as shown in FIG. 8.

In FIG. 8, the angles in the inclination direction are plotted clockwise with the longitudinal direction of the reed switch 105 regarded as 0 degrees and plotted at the top. On angles are related to solid lines, whereas the off angles are related to broken lines. According to FIG. 8, it is possible to detect the inclination in the longitudinal direction of the reed switch 105. However, dead regions were found to exist, within the angle range shown by "A" in FIG. 8, where the inclination in a direction orthogonal to the longitudinal direction of the reed switch 105 cannot practically be detected. In other words, the inclination or fall cannot be detected in all directions by the conventional inclination sensor.

Considering the points described above, the present invention aims to provide a compact fall detection sensor that can detect inclinations and fall in all directions.

Means for Solving the Problem

To achieve the above objective, a fall detection sensor according to the present invention comprises: a non-magnetic case mounted to an object whose fall is to be detected, the case having a hollow portion created by a recessed curved surface whose diameter increases upward around its central axis and a top surface that liquid-tightly closes the top edge of the curved surface; a magnet having magnetic poles in its longitudinal direction or a flat disk-shaped magnet magnetized in its radial direction housed in the hollow portion created by the curved surface and the closed top face of the case; a magnetic fluid sealed in the hollow portion and magnetically attached to at least both ends of the magnetic poles of the magnet; and a reed switch arranged so that its contact comes at or around the center of the bottom of the case, and is structured so that, when the object is in upright state, the central axis of the case extends in a vertical direction, the magnet whose magnetic poles are covered with the magnetic fluid is gravitationally positioned so that its magnetization direction extends approximately in parallel to the longitudinal direction of the reed switch around the central axis at the lowest position of the curved surface of the case, and each magnetic pole of the magnet respectively magnetizes a corresponding reed of the reed switch positioned immediately below the magnet, thus allowing one of the reeds of the reed switch to be magnetized to N pole, whereas the other reed to be magnetized to S pole, to attract each other, and turning on the reed switch, and when the object inclines from the upright state, the magnet slides along the curved surface of the case, deviating from the central axis of the case and allowing only one of the magnetic poles of the magnet to be positioned around the central axis, and thus the magnetic poles magnetize each reed of the reed switch to the same pole, turning off the reed switch.

According to the above configuration, when the object whose fall is to be detected is in upright state, the central axis of the case extends in a vertical direction, and the magnet is gravitationally positioned around the central axis, the lowest position of the curved surface, of the case. At that time, both magnetic poles of the magnet are magnetically attracted to face each reed of the reed switch, the magnetic pole direction extending approximately in parallel to the longitudinal direction of the reed switch. Both poles of the magnet respectively magnetize the opposite reed of the reed switch, allowing one of the reeds to be magnetized to N pole and the other reed to be magnetized to S pole. Both reeds of the reed switch are thus attracted to each other, turning on the reed switch. Since both reeds of the reed switch are attracted to each other by the magnetic influence of the magnet, the on state is maintained stably, unsusceptible to external effect such as magnetic field and vibration.

Meanwhile, with the inclination of the object whose fall is to be detected, the case and the reed switch also incline, slanting the central axis of the case. With the inclination of the case, the magnet deviates from the central axis along the curved surface of the case within the hollow portion of the case. Following the inclination direction of the case, the magnetic pole direction of the magnet rotates around the central axis. As the result, one of the magnetic poles comes close to the central axis on the bottom face of the case, whereas the other magnetic pole deviates from the central axis. One of the magnetic poles of the magnet is thus positioned around the central axis at the bottom face of the case where both reeds face each other, thus magnetizing both reeds to the same pole. Both reeds of the reed switch act repulsively to each other, turning off the reed switch. Since both reeds of the reed switch act repulsively by being magnetized by the magnetic influence of the magnet, the off state is maintained stably.

The bottom face of the hollow portion of the case is formed in a curved recess facing upward. Consequently, following the inclination of the object, the magnet gravitationally moves along the curved surface. At that time, since the magnetic fluid that covers the magnetic poles has lubricating function, the magnet moves along the curved surface smoothly, which ensures more accurate inclination detection. Since the reed switch is positioned horizontally in the upright state, the total height of the fall detection sensor can be maintained low to achieve compact configuration.

Since the curved surface of the case of the fall detection sensor according to the present invention is formed in a semi-spherical shape, the inclination can be always followed uniformly regardless of the inclination angle, ensuring more accurate inclination detection. A magnet that has two magnetic poles on the surface having the maximum area may be used.

The fall detection sensor according to the present invention is configured that the amount of the magnetic fluids magnetically attached to each magnetic pole respectively within the hollow portion of the case is selected preferably so that they do not contact each other on the side face or top and bottom face of the magnet. Hence, the magnetic field lines that come out of the magnetic pole of one of the magnets go along the outer side of the magnet and enter the other magnetic pole without passing through the magnetic fluid. The number of magnetic field lines increases, magnetizing each reed of the reed switch more efficiently and thus enhancing the sensitivity to the inclination.

The fall detection sensor according to the present invention is configured preferably that the total length of the reed switch is longer than the length of the magnet. That is why the magnet gravitationally moves significantly along the curved surface of the case when the inclination angle becomes larger, and the other magnetic pole is positioned around the edge of the curved surface. At this time, one of the magnetic poles is positioned around the central axis of the curved surface, facing, and magnetizing both reeds at around the center of the reed switch.

Effects of the Invention

According to the present invention, an excellent fall detection sensor compacts in size and capable of detecting fall and inclinations in all directions can be provided.

EMBODIMENTS OF THE INVENTION

The present invention will hereafter be described in detail based on the embodiment as shown in FIG. 1 to FIGS. 3A to 3D.

Figure 1:
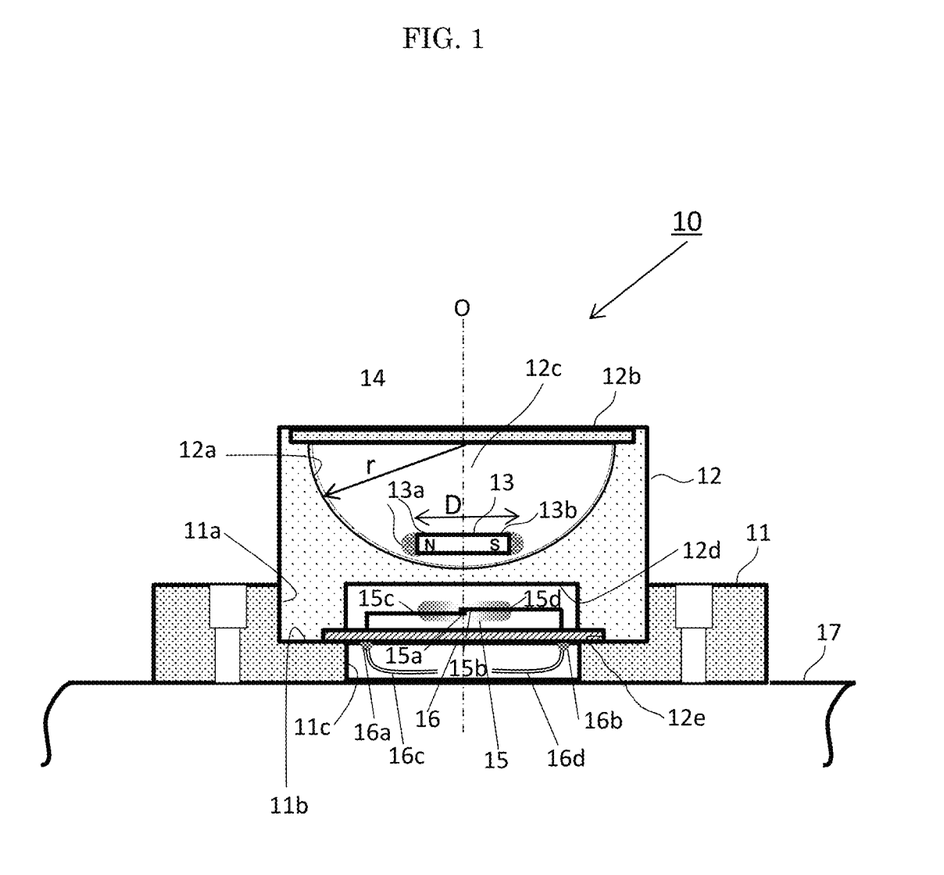
FIG. 1 is a cross-sectional view showing an embodiment of the fall detection sensor according to the present invention.
Figure 2:
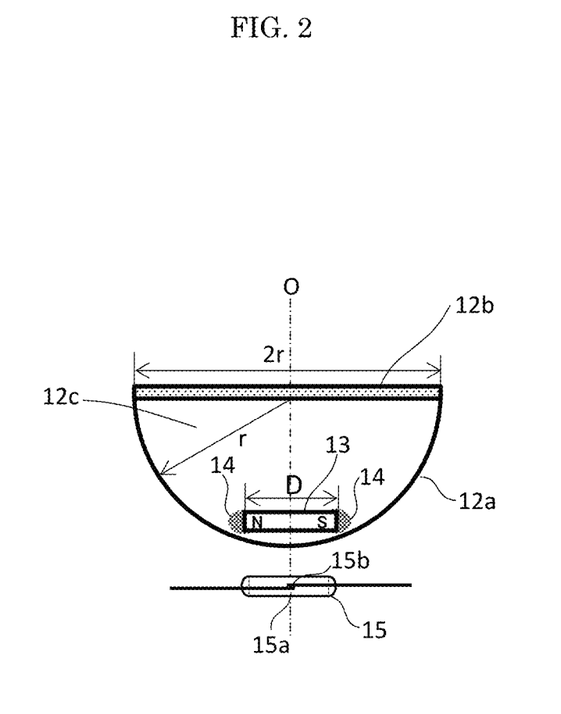
FIG. 2 is a schematic cross-sectional view showing a major part of the fall detection sensor in FIG. 1.

FIG. 1 and FIG. 2 show a typical configuration of a fall detection sensor according to the present invention, and FIGS. 3A to 3D show the shapes of magnets that can be used for the fall detection sensor in FIG. 1 and their magnetization direction. As shown by those figures, the fall detection sensor 10 according to this embodiment comprises a base 11, a case 12, a magnet 13, a magnetic fluid 14, a reed switch 15, and a printed circuit board 16.

The base 11 is made of a resin material for example, preferably made of a non-magnetic material, and fastened by screws, etc. (not shown) to an object 17 whose fall is to be detected. The object 17 whose fall is to be detected will hereafter be called the object 17. The base 11 has a case accepting part 11a that is open upward on the top face, and a recessed part 11c via a step part 11b around the center of the case accepting part 11a.

The case 12 is made of a non-magnetic material such as a resin and aluminum and has a concave-shaped curved surface 12a that is open upward around the central axis O. The top edge of this curved surface 12a is closed liquid-tightly, forming a hollow portion 12c. In this embodiment, a lid member 12b is provided to close the top face, forming a hollow portion 12c between the curved surface 12a and the lid member 12b. The curved surface 12a is formed point-symmetrically around the central axis O, its cross section forming a smooth curve such as a hemisphere having a constant radius of curvature r (see FIG. 2) for example.

The entire case 12 may be formed uniformly with the same material. In this embodiment, the lid member 12b is made of a plate-like member of a non-magnetic material and is attached liquid-tightly to the top edge of the curved surface 12a of the case 12. After the magnet 13 and the magnetic fluid 14 are housed in the hollow portion 12c, this lid member 12b is attached to the top edge of the curved surface 12a of the case 12. The magnet 13 and magnetic fluid 14 are sealed within the hollow portion 12c of this case 12.

The case 12 has a recessed part 12d around the center on its bottom face. The recessed part 12d is formed at a position facing the recessed part 11c of the base 11 in a state where the case 12 is fitted into the case accepting part 11a of the base 11. A printed circuit board 16, which is fitted around the recessed part 12d, has a second recessed part 12e, which is positioned with respect to the case 12.

Figure 3A:
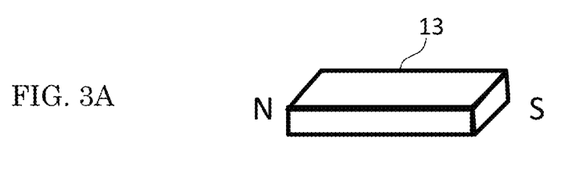
FIG. 3A, FIG. 3B, FIG. 3C and FIG. 3D are charts showing the shapes of magnets that can be used for the fall detection sensor in FIG. 1 and their magnetization direction.
Figure 3B:
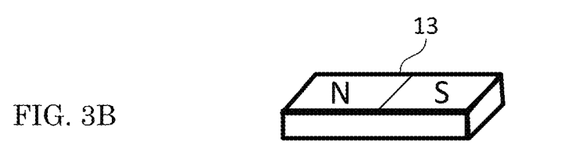
Figure 3C:
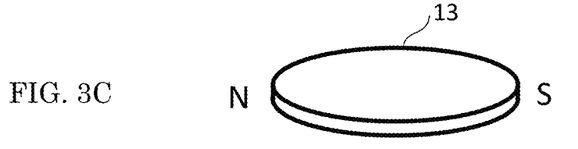
Figure 3D:
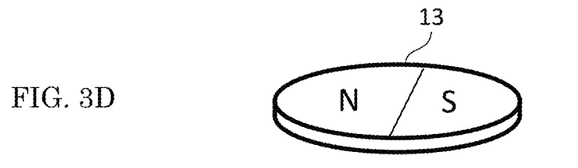

The magnet 13 is a permanent magnet such as ferrite and neodymium for example, and has a shape as shown in FIGS. 3A to 3D. The magnet 13 shown in FIG. 3A is in a rectangular bar shape and has magnetic poles at both ends in the longitudinal direction. The magnet 13 shown in FIG. 3B is in a rectangle shape magnetized in the thickness direction of the magnet, two magnetic poles formed on its face. The one shown in FIG. 3C is a flat disk-shaped magnet 13, and it has two magnetic pole faces formed on the outer peripheral surface. Meanwhile, the one shown in FIG. 3D is a disk-shaped magnet 13 magnetized in the thickness direction, two magnetic poles formed on its plane. For example, the magnet 13 as shown in FIG. 1 is formed in a flat disk shape, and is magnetized so that the magnetic poles 13a, 13b at both ends in the diametrical direction respectively become N and S poles. In this case, the magnet 13 is selected, as shown in FIG. 2, so that its outer diameter D is smaller than the radius of curvature r of the curved surface 12a.

The magnetic fluid 14 in known configuration is magnetically attached to the magnet 13 when housed in the hollow portion 12c of the case 12 together with the magnet 13. The magnetic fluid 14, which exists between the magnet 13 and the curved surface 12a of the case 12, acts as a lubricating material when the magnet 13 moves along the face of the curved surface 12a of the case 12, following the inclination of the object 17 as described later. This magnetic fluid is obtained with iron oxide paramagnetic ultrafine particles dispersed in materials such as isoparaffin, alkylnaphthalene, polyalphaolefin, and perfluoropolyether. As the magnetic fluid, those for vacuum sealing, bearings, and speakers can be used.

When the magnetic fluid 14 is housed within the hollow portion 12c of the case 12 together with the magnet 13, the magnetic fluid 14 is magnetically attached around the magnetic poles 13a, 13b at both ends of the magnet 13. The amount and viscosity of the magnetic fluid 14 are selected appropriately so as not to act as a magnetic shield of the magnet 13 by contacting the sides and top/bottom faces of the magnet 13 between both magnetic poles 13a, 13b of the magnet 13. The viscosity of the magnetic fluid 14 ranges from 30 mPa·s to over 10,000 mPa·s, and as the magnetic fluid for the present invention, the one having the viscosity of 30 mPa·s to 500 mPa·s is desirable although it depends also on the balance with the volume of the magnet. To ensure short detection time, viscosity ranging from 30 mPa·s to 100 mPa·s is desirable. When used for the fall detection sensor 10 used in an environment involving vibration, for two-wheeled motor vehicles for example, the viscosity of the magnetic fluid 14 is desirably 100 mPa·s to 500 mPa·s. It is only necessary to select the viscosity of the magnetic fluid 14 as required depending on the installation place and operating environment of the fall detection sensor 10. Since the magnetic field lines that connect the magnetic poles 13a, 13b on the outside of the magnet 13 is prevented from passing through the magnetic fluid 14, the number of magnetic field lines that have magnetic effect on the reed switch 15, which will be described later, on the outside of the magnet 13 will increase.

The reed switch 15 is in a known configuration, and is mounted on the printed circuit board 16, with its longitudinal direction orthogonal to the central axis O of the case 12 and its pair of reeds 15a, 15b positioned around the central axis O. As shown in FIG. 1, the reed switch 15 is arranged so that the contact of the reed switch 15 comes at or around the center of the bottom of the case 12, namely within the central region. The reed switch 15 is selected so that its entire length is longer than the diameter D of the magnet 13, and equal to or smaller than the maximum inner diameter (2r) of the hollow portion 12a of the case 12, namely the inner diameter at the top edge of the case shown in FIG. 2.

A pair of lead wires 15c, 15d that extend from both ends of the reed switch 15 are respectively soldered to the contacts 16a, 16b of the printed circuit board 16. The drawn lead wires 16c, 16d are respectively connected to each contact 16a, 16b. The lead wires 16c, 16d are drawn outside via the base 11 not shown. The printed circuit board 16 is fitted into a second recessed part 12e of the case 12. This printed circuit board is positioned with respect to the case 12 and fastened by fitting the bottom edge of the case 12 into the case accepting part 11a of the base 11. Each reed 15a, 15b of the reed switch 15 is thus positioned around the central axis O of the case 12.

With the fall detection sensor 10 in this embodiment, the base 11 is fastened to the object 17 whose fall is to be detected by using screws, etc. In a state where the object 17 is in upright position, not falling, the central axis O extends in vertical direction, and the magnet 13 gravitationally remains at the lowest position, namely around the central axis O, of the curved surface 12a of the case 12. In this state, each magnetic pole 13a, 13b of the magnet 13 respectively tends to come close to each reed 15a, 15b of the reed switch 15 by magnetic attraction, which is why the magnetic pole direction of the magnet 13 extends approximately in parallel to the longitudinal direction of the reed switch 15 as shown in FIG. 1 and FIG. 2.

Each reed 15a, 15b of the reed switch 15 is magnetized by corresponding magnetic poles 13a, 13b of the magnet 13. The reeds 15a, 15b are thus magnetized to different poles, attaching to each other, and thus turning on the reed switch 15. Since each reed 15a, 15b is magnetized respectively by the magnetic poles 13a, 13b, the on state of the reed switch 15 is maintained stably, is unsusceptible to external effect such as magnetic field and vibration for example, and the possibility of malfunction can thus be eliminated.

Once the object 17 starts to fall from the above-mentioned upright state, the fall detection sensor 10 also inclines at the same inclination angle with the object 17, hence the case 12 and the reed switch 15 also incline at the same inclination angle. However, the magnet 13 and magnetic fluid 14 within the hollow portion 12c of the case 12 gravitationally deviate from the central axis O along the surface of the curved surface 12a of the case 12, trying to always remain at the lowest position on the curved surface 12a in the vertical direction.

Figure 4:
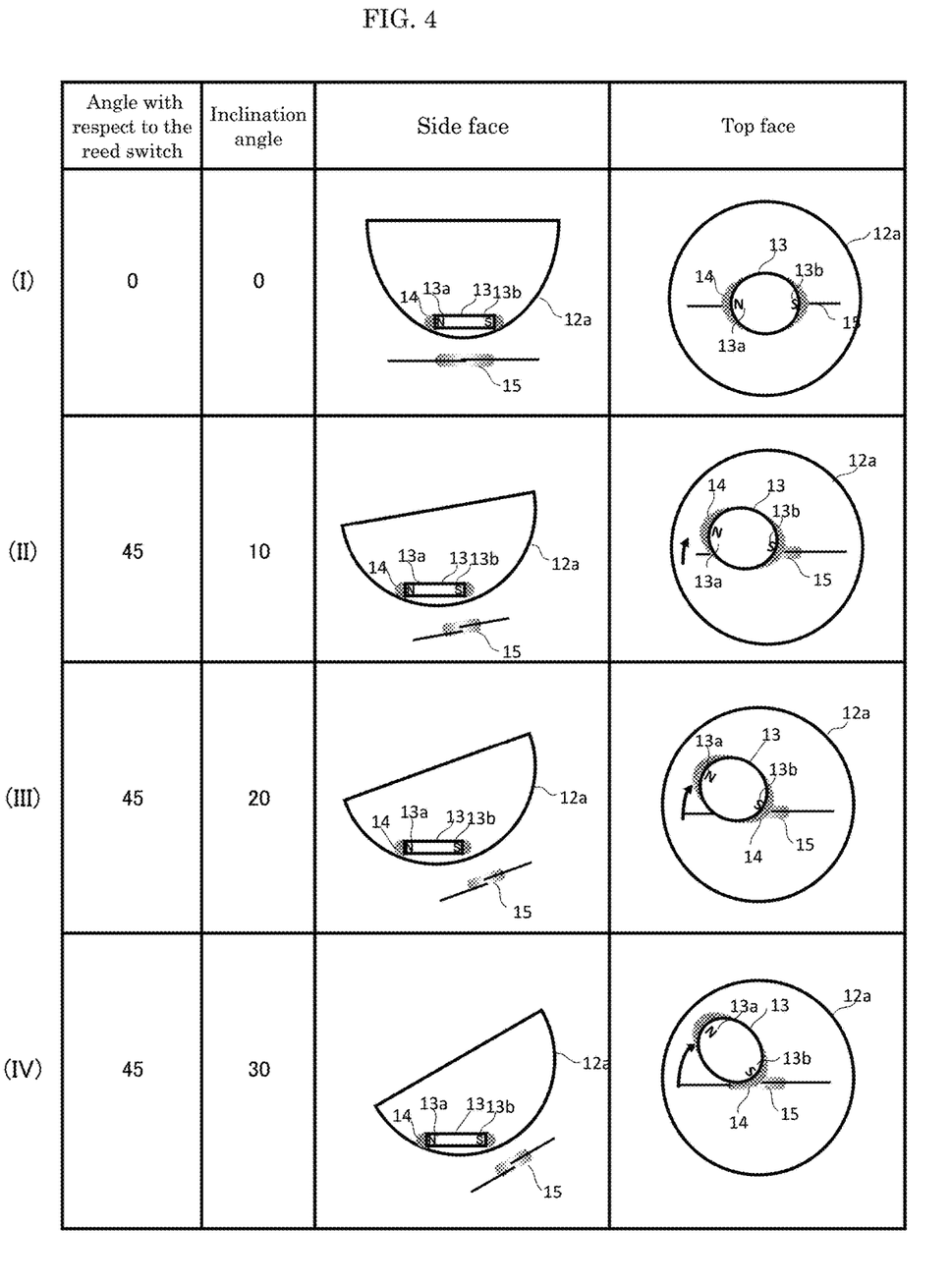
FIG. 4 shows cross-sectional views and plan views showing the relation between the curved surface of the case and the magnet of the fall detection sensor in FIG. 1 obtained when an object is inclined by 0-, 10-, 20-, and 30-degree inclination angles at the inclination direction of 0 and 45 degrees with respect to the longitudinal direction of the reed switch.

Now, the behavior of the magnet 13 in various inclination directions will be described by referring to FIG. 4 and FIG. 5. FIG. 4 shows cross-sectional views and plan views in various inclination directions showing the relation between the curved surface 12a of the case 12 and the magnet 13 of the fall detection sensor in FIG. 1 obtained when curved surface 12a is inclined by 0-, 10-, 20-, and 30-degrees inclination angles at the inclination direction of 0 and 45 degrees with respect to the longitudinal direction of the reed switch 15.

(I) at the top shows the case of upright state with inclination angle of 0 degree, the state being the same as FIG. 1 and FIG. 2. The second (II) shows the case where the inclination direction is 45 degrees, and the inclination angle is 10 degrees. If the curved surface 12a inclines by 10 degrees in the direction of the arrow (inclination direction of 45 degrees) on the plan view, the magnet 13 rotates slightly from 0 degrees in the horizontal direction, deviating along the cured surface 12a in a direction opposite to the inclination direction. The magnetic pole 13b, which is S pole of the magnet 13, thus comes close to the reed switch 15, increasing its magnetic attraction force. Meanwhile, the magnetic pole 13a, which is N pole, gets away from the reed switch 15, decreasing its magnetic attraction force. As shown by the cross-sectional view, the magnetic pole 13b of the magnet 13 comes close to the reeds 15a, 15b of the reed switch 15, magnetizing them to the same pole.

Similarly, the third (III) and the fourth (IV) show the cases where the inclination angles are 20 and 30 degrees. In either of the cases, the magnet 13 deviates along the curved surface 12a. The magnetic pole 13b of the magnet 13 thus maintains the state of being close to the reeds 15a, 15b around the center of the reed switch 15. Meanwhile, the magnetic pole 13a further gets away from the reed switch 15, further decreasing its magnetic attraction force. Specifically, as shown in the cross-sectional view, the reeds 15a, 15b of the reed switch 15 are magnetized to the same pole because the magnetic pole 13b of the magnet 13 is close by. With further decrease in magnetic attraction force, the magnet 13 rotates horizontally toward the direction opposite to the inclination direction and stabilizes at 45 degrees.

Figure 5:
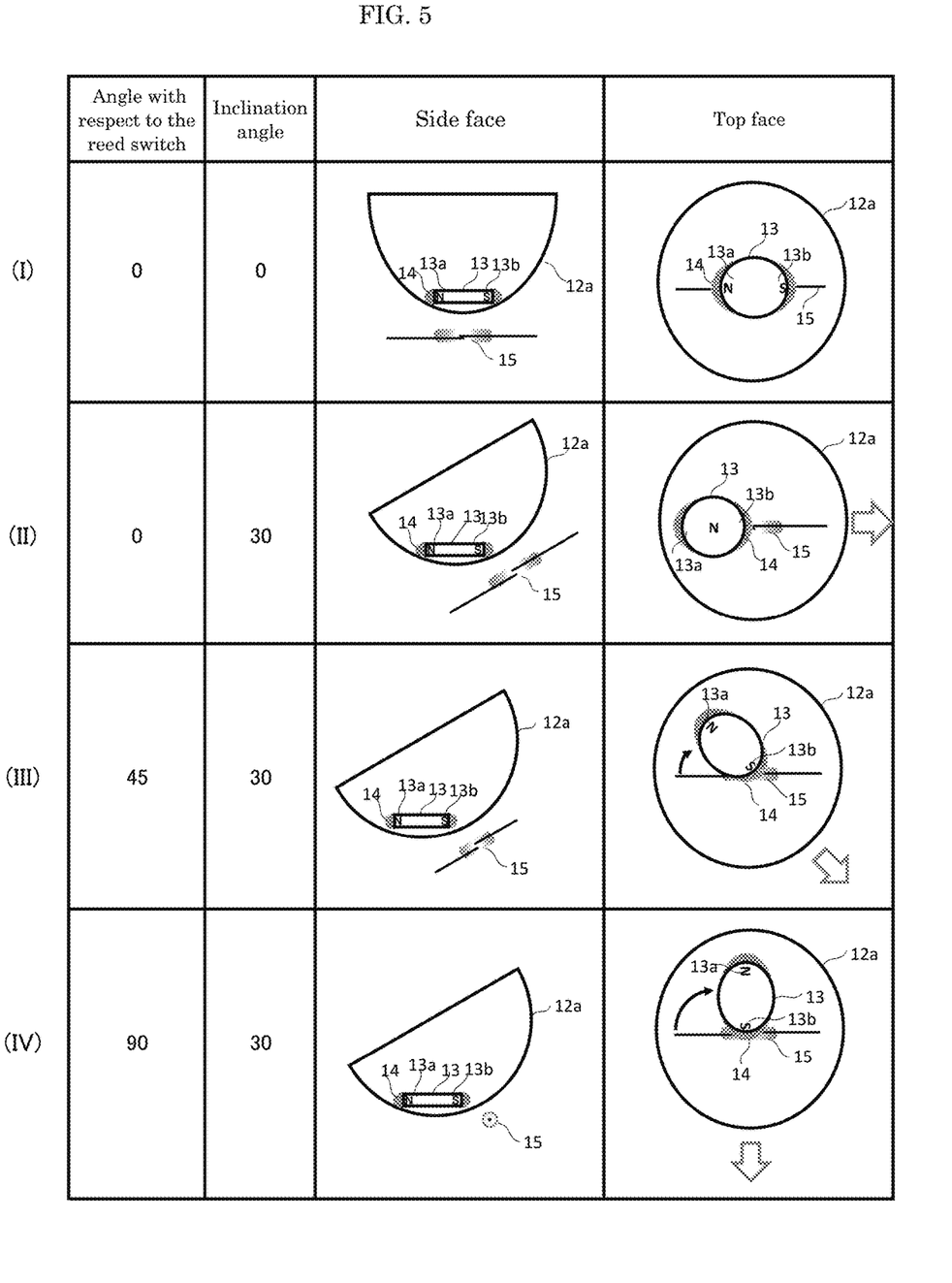
FIG. 5 shows cross-sectional views and plan views schematically showing the operation of the fall detection sensor in FIG. 1 obtained when the object is inclined by 0- and 30-degree inclination angles at the inclination direction of 0, 45, and 90 degrees with respect to the longitudinal direction of the reed switch.

FIG. 5 shows cross-sectional views and plan views schematically showing the relation between the curved surface 12a of the case 12 and the magnet 13 obtained when the curved surface 12a is inclined by 0- and 30-degrees inclination angles in the inclination directions of 0, 45, and 90 degrees with respect to the longitudinal direction of the reed switch 15.

(I) at the top shows the upright state with the inclination angle of 0 degrees, the state being the same as FIG. 1, FIG. 2, and FIG. 4 (I). The second (II) shows the case where the inclination direction is 0 degrees and inclination angle is 30 degrees. If the curved surface 12a inclines by 30 degrees in the direction of the arrow on the plan view (inclination direction: 0 degrees), the magnet 13 deviates along the curved surface 12a in the inclination direction without rotating in the horizontal direction. The magnetic pole 13b, which is S pole of the magnet 13, also comes close to the reed switch 15 accordingly, increasing its magnetic attraction force. Meanwhile, the magnetic pole 13a, which is N pole, gets away from the reed switch 15, decreasing its magnetic attraction force. As shown in the cross-sectional view, because the magnetic pole 13b of the magnet 13 comes close to the reeds 15a, 15b of the reed switch 15, the reeds 15a, 15b are magnetized to the same pole.

Similarly, the third (III) and the fourth (IV) show the cases where the inclination angles are 45 degrees (as in the case of FIG. 4) and 90 degrees. In either of the cases, the magnet 13 deviates along the curved surface 12a, and at the same time rotates horizontally in a direction opposite to the inclination direction. The magnetic pole 13b of the magnet 13 thus maintains the state of being close to the reeds 15a, 15b around the center of the reed switch 15. Meanwhile, the magnetic pole 13a is in a state away from the reed switch 15, with its magnetic attraction force further decreasing. In other words, as shown in the cross-sectional view, the reeds 15a, 15b of the reed switch 15 are magnetized to the same pole because the magnetic pole 13b of the magnet 13 comes close, and the magnet 13 rotates horizontally in a direction opposite to the inclination direction due to further decrease in the magnetic attraction force and stabilizes in the direction of 45 degrees.

As described above, the magnet 13 of the fall detection sensor 10 slides following the tilt direction and tilt angle along the curved surface 12a of the case 12 with respect to all inclination directions of the object 17. By magnetizing one of the magnetic poles 13a or 13b to the same pole by allowing it to face the reeds 15a, 15b around the center of the reed switch 15, the reeds 15a, 15b act repulsively to each other, turning off the reed switch 15. At that time, since both reeds 15a, 15b are magnetized by the magnetic influence of the magnetic poles 13a, 13b of the magnet 13, the off state of the reed switch 15 can be maintained stably, insusceptible to the external effect such as the magnetic field and the vibration.

The fall detection sensor 10 according to the present invention can detect inclination and fall in all inclination directions of the reed switch 15, which has never been possible with the fall detection sensors according to the prior art. Since the reed switch 15 is turned off when inclination or fall is detected, the reed switch 15 can automatically stop the operation of the object 17. For example, if the objects 17 are various appliances such as fan heaters and electric hot-water pots, the operation of these appliances can be automatically stopped by the reed switch 15. Since the reed switch 15 is encapsulated air-tightly in a container made of glass, etc., the switch is rarely affected by corrosive ambient atmosphere for example, and the fall detection sensor 10 highly resistant to environment can thus be provided.

The material and dimensions of the magnet 13 can be selected as required according to the size of the reed switch 15. The distance between the lowest position of the curved surface 12a of the case 12 in upright state and the reed switch 15 can be selected as required based on the magnetic characteristics and dimensions of the permanent magnet 13 and the working value of the reed switch 15.

Figure 6:
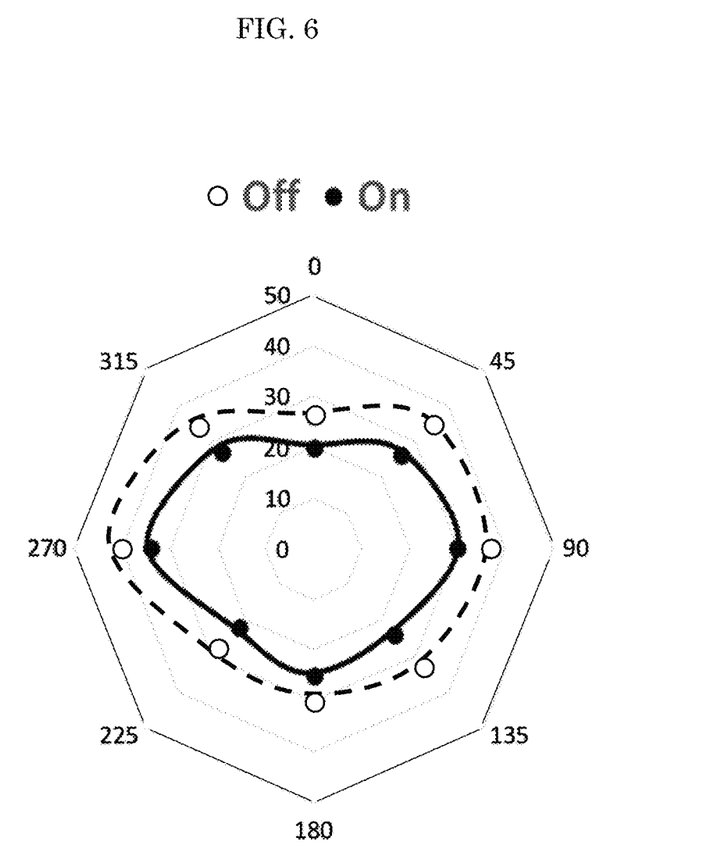
FIG. 6 is a chart showing the on and off angles of the fall detection sensor in FIG. 1 in various inclination directions.

FIG. 6 shows the result of measurement of on and off angles in various inclination directions taken by using a prototype of the above-mentioned fall detection sensor 10. The radius of the curved surface 12a of the case 12 was 6φ, and as the magnet 13, a neodymium magnet having the diameter D of 5 mm and thickness of 1 mm magnetized in the diametrical direction was used. At the position 5 mm away from the central axis O at the bottom of the curved surface 12a, a reed switch RD-18B manufactured by NIPPON ALEPH CO., LTD. (the present applicant) was placed to fabricate the prototype of the fall detection sensor 10.

By using this prototype, the fall detection sensor was inclined in the inclination directions of 45, 90, 135, 180, 225, 270, and 315 degrees with the longitudinal direction of the reed switch 15 regarded as 0 degrees. The inclination angle at which the reed switch 15 is turned off (off angle) and the inclination angle at which the reed switch 15 is turned on again (on angle) were measured, and the result shown in FIG. 6 was obtained. In FIG. 6, the on angles of measurement values were related to a solid line, whereas the off angles related to a broken line. According to this result, off and on of the reed switch 15 were measured in all directions of the fall detection sensor 10. It was thus confirmed that the fall detection sensor 10 according to the present invention can detect the fall in all directions.

The present invention can be carried out in various embodiments without departing from the scope of the present invention. For example, in the above-mentioned embodiment, the magnet 13 is formed in a flat disk-like shape, but the magnet may be in a rectangular shape. In this case, the magnet 13 covered with the magnetic fluid 14 can move smoothly along the surface of the curved surface 12a of the case 12 by allowing the center of the magnet to be open vertically.

In the above-mentioned embodiment, the curved surface 12a of the case 12 is formed as a surface in a hemispherical shape. However, it may be in a smooth curved surface in a concave shape with its radius of curvature continuously changing. The smooth moving of the magnet 13 along the curved surface 12a of the case 12 can thus be ensured.

REFERENCE SIGNS LIST

10: Fall detection sensor
11: Base
11a: Case accepting part
11b: Step part
11c: Recessed part
12: Case
12a: Curved surface
12b: Lid member
12c: Hollow portion
12d: Recessed part
12e: Second recessed part
13: Magnet
13a, 13b: Magnetic pole
14: Magnetic fluid
15: Reed switch
15a, 15b: Reed
16: Printed circuit board
16a, 16b: Contact
16c, 16d: Drawn lead wire
17: Object whose fall is to be detected (object)

What is claimed is:

1. A fall detection sensor, comprising:
a non-magnetic case mounted to an object whose fall is to be detected, the case having a hollow portion created by a recessed curved surface whose diameter increases upward around its central axis and a top surface that liquid-tightly closes the top edge of the curved surface;
a magnet having magnetic poles in its longitudinal direction, or a flat disk-shaped magnet magnetized in its radial direction housed in the hollow portion created by the curved surface and the closed top face of the case;
a magnetic fluid sealed in the hollow portion and magnetically attached to at least both ends of the magnetic poles of the magnet; and
a reed switch arranged so that its contact comes at or around the center of the bottom of the case, wherein
the recessed curved surface has a hemisphere having a constant radius of curvature,
when the object is in upright state, the central axis of the case extends in a vertical direction, the magnet whose magnetic poles are covered with the magnetic fluid is gravitationally positioned so that its magnetization direction extends approximately in parallel to the longitudinal direction of the reed switch around the central axis at the lowest position of the curved surface of the case, and each magnetic pole of the magnet respectively magnetizes a corresponding reed of the reed switch positioned immediately below the magnet, thus allowing one of the reeds of the reed switch to be magnetized to N pole, whereas the other reed to be magnetized to S pole, to attract each other, and turning on the reed switch, and
when the object inclines from the upright state, the magnet slides following the tilt direction and tilt angle along the curved surface having the hemisphere with the constant radius of curvature, deviating from the central axis of the case and allowing only one of the magnetic poles of the magnet to be positioned around the central axis, and thus the magnetic poles magnetize each reed of the reed switch to the same pole, turning off the reed switch with respect to all inclination directions of the object.

2. The fall detection sensor as set forth in claim 1, wherein the top edge of the curved surface is closed liquid-tightly with a lid member.

3. The fall detection sensor as set forth in claim 1, wherein a magnet with its two magnetic poles positioned on its face having the maximum area is used.

4. The fall detection sensor as set forth in claim 1, wherein the amount of the magnetic fluids is selected so that the magnetic fluids respectively attached to each magnetic pole of the magnet within the hollow portion of the case do not contact each other on the sides or top and bottom faces of the magnet.

5. The fall detection sensor as set forth in claim 1, wherein the total length of the reed switch is longer than the magnet.

* * * * *